United States Patent Office 2,989,344
Patented June 20, 1961

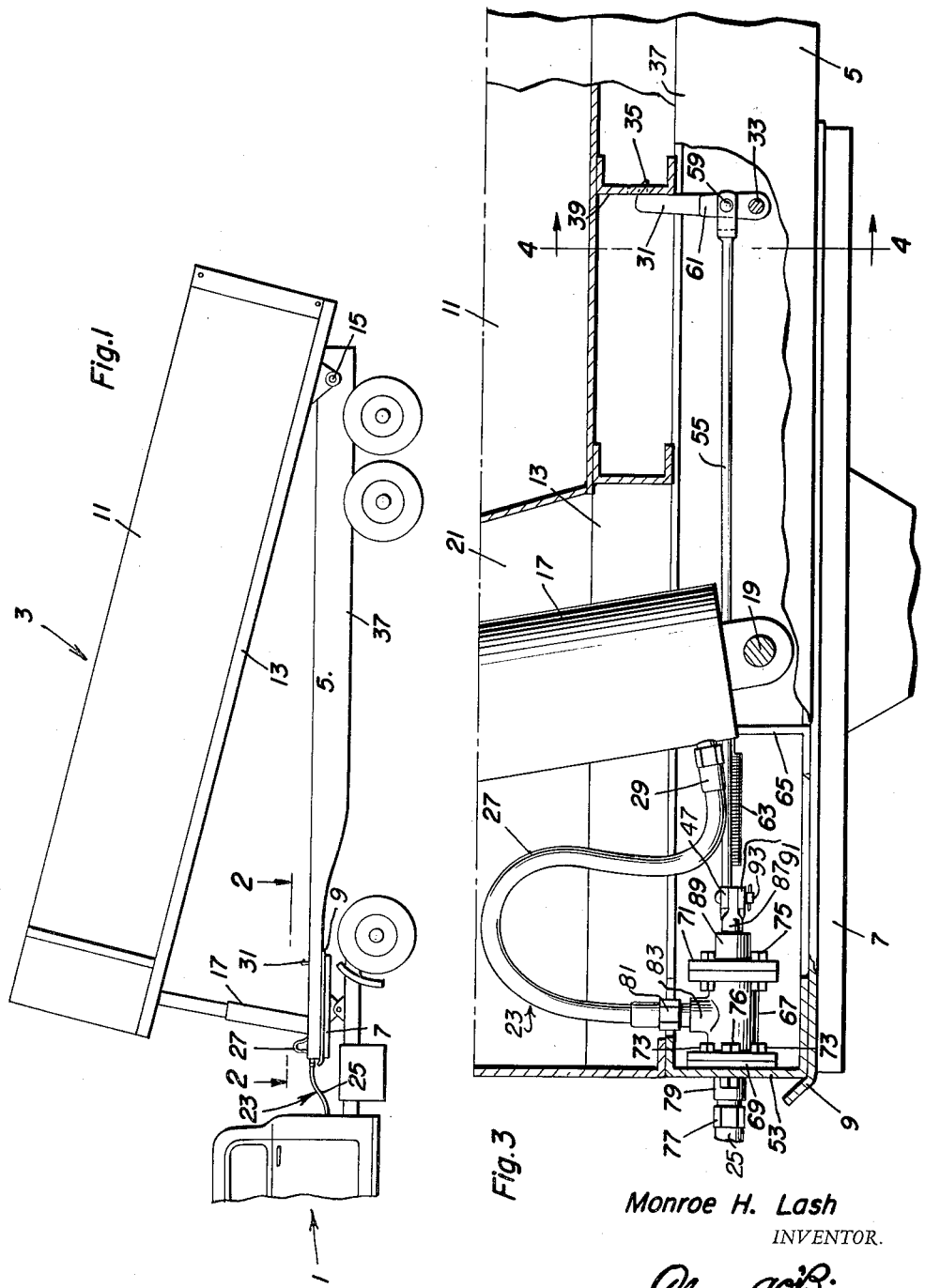
Monroe H. Lash
INVENTOR.

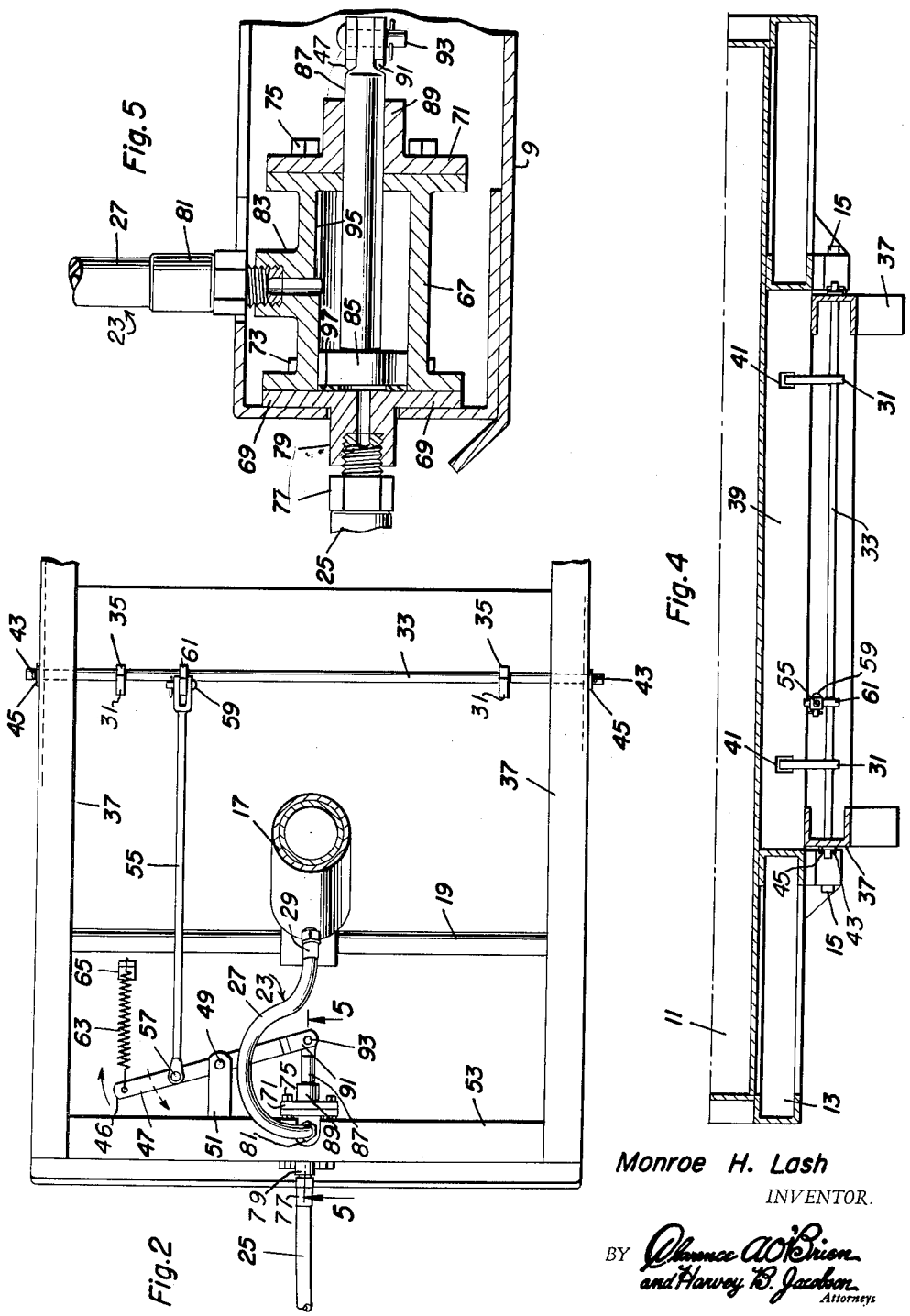

2,989,344
HYDRAULICALLY RELEASED TRACTOR-TRAILER DUMP BODY LATCHING DEVICE
Monroe H. Lash, Selinsgrove, Pa., assignor to Trailco Manufacturing and Sales Co., Hummels Wharf, Pa., a corporation of Pennsylvania
Filed Apr. 7, 1958, Ser. No. 726,724
1 Claim. (Cl. 298—22)

This invention relates to improvements in releasable hold down latch devices for tractor trailer dump bodies, especially, although not necessarily, of the front lift type, and to hydraulically operated releasing means for the latch devices.

By way of premise, such dump bodies are commonly dumped by a front mount hydraulic telescopically extensible hoist raising the dump bodies on pivots in response to feed of oil under pressure to the hoists from a supply tank by a pump. These dump bodies when lowered and unloaded bounce up and down which is objectionable particularly because it causes excessive wear on the dump body pivots and also on the hoists which as a result frequently develop slight leaks admitting air into the hoists allowing oil therein to leak back into the supply tanks and to be replaced by air bubbles interfering with efficient operation of the hoists.

The primary object of this invention is to obviate the above objections to dump body trailers having hydraulic telescopic hoists by providing a latch device for rigidly holding the dump body down, and means for releasing the latch device hydraulically operated by oil under pressure from the supply tank and just prior to operation of the hoist.

Another object is to provide for hydraulic release of the latch device by means including a hydraulically operated piston in a cylinder interposed in the pressure feed oil line of the hoist for utilizing the oil fed under pressure through said line to the hoist.

Still another object is to provide a latch device and hydraulically operated releasing means therefor of simple practical construction, not liable to get out of order, and inexpensive to manufacture and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a dump body tractor trailer equipped with a latch device and releasing means of this invention;

FIGURE 2 is an enlarged fragmentary view in horizontal section taken on the line 2—2 of FIGURE 1 with the dump body eliminated;

FIGURE 3 is an enlarged fragmentary view in longitudinal section of the dump body with parts associated therewith partly in section and partly in side elevation, and the hoist and latch device and releasing means shown in side elevation;

FIGURE 4 is a fragmentary view in vertical cross-section taken on the line 4—4 of FIGURE 3, and FIGURE 5 is an enlarged fragmentary view in vertical longitudinal section taken on the line 5—5 of FIGURE 2.

Referring to the drawings by numerals, 1 designates, generally, a tractor, and 3 a dump body trailer embodying this invention and having a chassis frame 5 coupled by the usual fifth wheel 7 and turntable 9 to the tractor 1 and supporting a dump body 11 having a bottom supporting frame 13 pivoted, as at 15, to the chassis frame 5 for raising from a lowered position of rest on the chassis frame 5 to dump the body 11 by means of a front mount telescopically extensible hoist 17.

The hoist 17 is pivoted at its lower end in upright position on a crossrod 19 on the chassis frame 5 and is operatively connected to the dump body 11 in a chamber 21 in the front portion of said body 11 in a conventional manner well understood in the art and requiring no explanation herein.

A pressure feed line 23 for introducing hydraulic pressure into the hoist 17 for operating said hoist extends from the tractor 1 to the lower end of the hoist 17 from a pump, not shown, on the tractor 1 supplied from an oil tank, not shown, on said tractor. The pressure feed line 23 according to this invention is divided, for a purpose presently seen, into front and rear pressure feed line sections 25, 27, the latter being coupled, as at 29, to the hoist 17.

The latch device of this invention comprises a pair of upright hold down latch dogs 31 in the chassis frame 5 adjacent opposite sides thereof and fixed at their lower ends on a transverse rock shaft 33. The dogs 31 are formed with undercut upper ends 35 and the rock shaft 33 is journaled in the side beams 37 of the chassis frame 5 so that said dogs 31 are rocked by said shaft clockwise or counter-clockwise, as shown in FIGURE 3, into and from latching position respectively in front of a transverse beam 39 on the supporting frame 13 of the dump body 11. As will presently be clear, the dogs 31 when rocked from latching position are rocked into releasing position. In the latching and releasing positions of the latch dogs 31, the upper ends 35 of said dogs are projected and retracted respectively into and out of openings 41 in the beam 39 to hold the body 11 down and release the same. The rock shaft 33 is provided with cotter pins 43 and washers 45 to prevent end play of said shaft in the chassis frame. Means is provided for rocking the rock shaft 33 to rock the latch dogs 31 comprising a horizontal shaft operating lever 47 pivoted, as at 49, intermediate its ends in the front end portion of the chassis frame 5 on a rearwardly extending bracket 51 on a front beam 53 of said frame 5 for swinging of the lever clockwise or counter-clockwise respectively as shown in FIGURE 2. A link rod 55 is pivoted at one end, as at 57, to the lever 47 between one end of the lever 47 and its pivot 49 and has its other end pivoted, as at 59, to an upstanding arm 61 fixed on the rod shaft 33. A tension spring 63 connected to the before mentioned end 46 of said lever 47 and to a bracket 65 on the chassis frame 5 tends to swing said lever 47 clockwise.

Hydraulically operated means is provided for rocking the lever 47 counter-clockwise comprising the following. A terminally flanged horizontal hydraulic cylinder 67 in the front end portion of the chassis frame 5 with front and rear cylinder heads 69, 71 bolted thereto, as at 73, 75 is secured by bolts as at 76 to the beam 53. The pressure feed line section 25 is coupled, as at 77, to an oil inlet nipple 79 on the front cylinder head 69. The pressure feed line section 27 is coupled as at 81 to a radial oil discharge nipple 83 on the cylinder 67 midway between the ends of said cylinder.

A piston 85 in the cylinder 67 is adapted to advance from a retracted position past the nipple 83 to project and retract a piston rod 87 slidable through a bearing nipple 89 on the rear cylinder head 71 and is terminally operatively connected by a slot and pin connection 91, 93 to the other end of the lever 47 on the side of the pivot 49 opposite to that at which the spring 63 and rod 55 are connected to said lever.

A longitudinal internal by-pass bleed groove 95 in the cylinder 67 between the outlet nipple 83 and the rear cylinder head 71 is provided and a neoprene gasket 97 on one face of the piston 85 all for a purpose presently clear.

Referring now to the operation of the invention, when the dump body 11 is down, as shown in FIGURE 3, the spring 63 swings the lever 47 clockwise, as indicated by the full line arrow in FIGURE 2 to cause the rod 55 to correspondingly rock the rock shaft 33 and the latch dogs 31 to project the ends 35 of said latch dogs 31 into the openings 41 to latch the dump body 11 down and retract the piston rod 87 and piston 85 until the latter engages the front cylinder head 69 and assumes a normal position in which it is in front of the nipple 83 and blocks the passage of oil through the pressure feed line 23 and outlet nipple 83 to the hoist 17 by way of the pressure feed line section 27. Oil under pressure introduced into the pressure feed line 23 for operation of the hoist 17 for dumping the dump body 11 discharges into the cylinder 67 from the pressure feed line section 25 and advances the piston 85, rearwardly, past the nipple 83 to permit oil under pressure to enter the outlet nipple 83 and pressure feed line section 27 to pass to and operate the hoist 17. During such advance of the piston 85 to the nipple 83, the piston rod 67 advances to swing the lever 47 counter-clockwise, as indicated by the broken line arrow in FIGURE 2, into the position shown in FIGURE 2, against the tension of the spring 63 and such swinging of the lever 47 correspondingly rocks the dogs 31 to retract their ends 35 out of the openings 41 to release the dump body 11 for dumping prior to operation of the hoist 17 and operation of the dump body into dumping position shown in FIGURE 1.

When the piston 85 is advanced past the outlet nipple 83 it advances to the bleed groove 95 which then bleeds captive oil in advance of the piston 85 to the opposite side of said piston to relieve pressure in advance of the piston. The neoprene gasket 97 in the retracted position of the piston 85 is clamped by said piston between the same and the front cylinder head 69 to prevent reserved oil in the hoist 17 from leaking back into the tank, not shown.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

In combination with a chassis frame, a dump body supporting frame mounted on said chassis frame for swinging movement from a horizontal down position to an upwardly raised position about a horizontal axis adjacent its rear end, a hydraulic hoist on said chassis frame operated to so swing the dump body supporting frame, and a hydraulic pressure feed line constituting the sole means for supplying hydraulic fluid under pressure to said hoist and for withdrawing the fluid from said hoist, a spring-tensioned latch device on said chassis frame normally engaging and latching said supporting frame in its down position and operative to release said supporting frame, hydraulically operated means on said chassis frame disposed in said pressure feed line in series relation with said hydraulic hoist for operation responsive to fluid pressure within said line for releasing said latch device prior to admitting the passage of the hydraulic fluid to said hoist, said hydraulically operated means comprising a cylinder having an axially directed inlet end coupled in said line and a closed axial end spaced from said inlet end, a radial outlet nipple communicating with said cylinder intermediate of its ends and coupled in said line, the interior of said cylinder from said inlet end to said nipple cooperating with said pressure feed line to define a common flow path for hydraulic fluid both to and from said hoist, a piston in said cylinder movable from the inlet end toward said closed end responsive to the admission of hydraulic fluid under pressure through said inlet end to and past said outlet nipple, said piston normally being in a retracted position between the inlet end and said nipple wherein it blocks discharge through said nipple, and a piston rod fixed to said piston and slidably disposed through said closed end, said piston rod operatively connecting the piston to said latch device and operative to release said device incident to advance of the piston from its retracted position past said nipple, said cylinder being formed internally with a bleed groove communicating with and extending axially from said nipple toward the closed end of the cylinder, whereby to permit passage of fluid from one side to the other of said piston as the piston advances past and is retracted toward said nipple.

References Cited in the file of this patent
UNITED STATES PATENTS

| | | |
|---|---|---|
| 496,672 | Thacker | May 2, 1893 |
| 2,237,299 | Benbow et al. | Apr. 8, 1941 |
| 2,543,210 | Wagstaff | Feb. 7, 1951 |
| 2,749,175 | King et al. | June 5, 1956 |